(12) United States Patent
Venkatesan et al.

(10) Patent No.: US 7,421,128 B2
(45) Date of Patent: Sep. 2, 2008

(54) SYSTEM AND METHOD FOR HASHING DIGITAL IMAGES

(75) Inventors: Ramarathnam Venkatesan, Redmond, WA (US); Say-Ming William Koon, Wilmington, MA (US)

(73) Assignee: Microsoft Corporation, Redmond, WA (US)

( * ) Notice: Subject to any disclaimer, the term of this patent is extended or adjusted under 35 U.S.C. 154(b) by 781 days.

(21) Appl. No.: 10/628,751

(22) Filed: Jul. 28, 2003

(65) Prior Publication Data
US 2004/0025025 A1    Feb. 5, 2004

Related U.S. Application Data

(63) Continuation of application No. 09/421,986, filed on Oct. 19, 1999, now Pat. No. 6,671,407.

(51) Int. Cl.
*G06K 9/36* (2006.01)

(52) U.S. Cl. .................. 382/232; 382/240; 382/100

(58) Field of Classification Search ............... 382/100, 382/232, 239, 248, 234, 251, 382, 240; 713/176, 713/80, 180, 181; 380/201; 704/270; 348/465, 348/463; 710/73; 707/5; 379/100.04
See application file for complete search history.

(56) References Cited

U.S. PATENT DOCUMENTS

| | | | | |
|---|---|---|---|---|
| 4,773,039 | A | 9/1988 | Zamora ................... | 715/540 |
| 5,093,869 | A | 3/1992 | Alves et al. .............. | 382/199 |
| 5,210,820 | A | 5/1993 | Kenyon .................... | 704/200 |
| 5,351,310 | A | 9/1994 | Califano et al. .......... | 382/199 |

(Continued)

FOREIGN PATENT DOCUMENTS

EP    0581317    2/1994

(Continued)

OTHER PUBLICATIONS

Chang et al., "RIME: A Replicated Image Detector for the World-Wide Web", 10 pages, 1998.*

(Continued)

*Primary Examiner*—Anh Hong Do
(74) *Attorney, Agent, or Firm*—Lee & Hayes, PLLC

(57) ABSTRACT

A system has an image store, a digital hashing unit, and a watermark encoder. A digital image hashing unit computes a hash value representative of a digital image in such a manner that visually similar images hash to the same hash value and visually distinct images hash to different values. The hash value is stored in an image hash table and is associated via the table with the original image. This image hash table can be used to index the image storage. A watermark encoder computes a watermark based on the hash value and a secret. Using both values renders the watermark resistant to BORE (Break Once, Run Everywhere) attacks because even if the global watermark secret is discovered, an attacker still needs the hash value of each image to successfully attack the image. The system can be configured to police the Internet to detect pirated copies. The system randomly collects images from remote Web sites and hashes the images using the same hashing function. The system then compares the image hashes to hashes of the original images. If the hashes match, the collected image is suspected as being a copy of the original.

15 Claims, 4 Drawing Sheets

U.S. PATENT DOCUMENTS

| | | | | |
|---|---|---|---|---|
| 5,425,081 | A | * | 6/1995 | Gordon et al. ......... 379/100.04 |
| 5,465,353 | A | * | 11/1995 | Hull et al. ...................... 707/5 |
| 5,535,020 | A | | 7/1996 | Ulichney .................. 358/3.13 |
| 5,613,004 | A | | 3/1997 | Cooperman et al. ........... 380/28 |
| 5,664,016 | A | | 9/1997 | Preneel et al. ................ 380/28 |
| 5,687,236 | A | | 11/1997 | Moskowitz et al. ........... 380/28 |
| 5,689,639 | A | * | 11/1997 | Schwarz ...................... 710/73 |
| 5,734,432 | A | | 3/1998 | Netravali et al. ....... 375/240.05 |
| 5,774,588 | A | | 6/1998 | Li .............................. 382/230 |
| 5,802,518 | A | | 9/1998 | Karaev et al. ................... 707/9 |
| 5,809,498 | A | | 9/1998 | Lopresti et al. ................ 707/6 |
| 5,875,264 | A | | 2/1999 | Carlstrom ................... 382/181 |
| 5,899,999 | A | | 5/1999 | De Bonet ................ 707/104.1 |
| 5,915,038 | A | | 6/1999 | Abdel-Mottaleb et al. ... 382/209 |
| 5,918,223 | A | | 6/1999 | Blum et al. .................... 707/1 |
| 5,953,451 | A | | 9/1999 | Syeda-Mahmood ......... 382/187 |
| 6,081,893 | A | | 6/2000 | Grawrock et al. ........... 713/283 |
| 6,101,602 | A | | 8/2000 | Fridrich ...................... 713/176 |
| 6,246,777 | B1 | | 6/2001 | Agarwal et al. ............. 382/100 |
| 6,249,616 | B1 | | 6/2001 | Hashimoto .................. 382/284 |
| 6,278,385 | B1 | | 8/2001 | Kondo et al. ................. 341/50 |
| 6,314,192 | B1 | | 11/2001 | Chen et al. .................. 382/100 |
| 6,321,232 | B1 | | 11/2001 | Syeda-Mahmood ...... 707/104.1 |
| 6,363,381 | B1 | | 3/2002 | Lee et al. ....................... 707/6 |
| 6,363,463 | B1 | | 3/2002 | Mattison ..................... 711/164 |
| 6,370,272 | B1 | | 4/2002 | Shimizu ..................... 382/232 |
| 6,377,965 | B1 | | 4/2002 | Hachamovitch et al. .... 715/534 |
| 6,385,329 | B1 | | 5/2002 | Sharma et al. .............. 382/100 |
| 6,401,084 | B1 | | 6/2002 | Ortega et al. ................... 707/2 |
| 6,418,430 | B1 | | 7/2002 | DeFazio et al. ................ 707/3 |
| 6,477,276 | B1 | | 11/2002 | Inoue et al. ................. 382/232 |
| 6,513,118 | B1 | * | 1/2003 | Iwamura ..................... 713/176 |
| 6,522,767 | B1 | | 2/2003 | Moskowitz et al. ......... 382/100 |
| 6,532,541 | B1 | | 3/2003 | Chang et al. ................ 713/176 |
| 6,546,114 | B1 | | 4/2003 | Venkatesan et al. ......... 382/100 |
| 6,574,348 | B1 | | 6/2003 | Venkatesan et al. ......... 382/100 |
| 6,584,465 | B1 | | 6/2003 | Zhu et al. ....................... 707/6 |
| 6,625,295 | B1 | | 9/2003 | Wolfgang et al. ........... 382/100 |
| 6,647,128 | B1 | | 11/2003 | Rhoads ....................... 382/100 |
| 6,658,423 | B1 | | 12/2003 | Pugh et al. .................. 707/102 |
| 6,658,626 | B1 | | 12/2003 | Aiken ......................... 715/526 |
| 6,671,407 | B1 | | 12/2003 | Venkatesan et al. ......... 382/232 |
| 6,674,861 | B1 | | 1/2004 | Xu et al. ..................... 380/252 |
| 6,687,416 | B2 | | 2/2004 | Wang .......................... 382/278 |
| 6,700,989 | B1 | | 3/2004 | Itoh et al. .................... 382/100 |
| 6,701,014 | B1 | | 3/2004 | Syeda-Mahmood ......... 382/199 |
| 6,725,372 | B1 | | 4/2004 | Lewis et al. ................. 713/176 |
| 6,751,343 | B1 | | 6/2004 | Ferrell et al. ................ 382/145 |
| 6,754,675 | B2 | | 6/2004 | Abdel-Mottaleb et al. ........ 707/104.1 |
| 6,768,809 | B2 | | 7/2004 | Rhoads et al. .............. 382/100 |
| 6,768,980 | B1 | | 7/2004 | Meyer et al. ................ 704/500 |
| 6,771,268 | B1 | | 8/2004 | Crinon ........................ 345/475 |
| 6,782,361 | B1 | | 8/2004 | El-Maleh et al. ............ 704/226 |
| 6,799,158 | B2 | | 9/2004 | Fischer et al. ............... 704/205 |
| 6,839,673 | B1 | | 1/2005 | Choi et al. ................... 704/273 |
| 6,864,897 | B2 | | 3/2005 | Brand ......................... 345/582 |
| 6,879,703 | B2 | | 4/2005 | Lin et al. ..................... 382/100 |
| 6,901,514 | B1 | | 5/2005 | Iu et al. ....................... 713/176 |
| 6,907,527 | B1 | | 6/2005 | Wu ............................. 713/176 |
| 6,971,013 | B2 | * | 11/2005 | Mihcak et al. .............. 713/180 |
| 6,973,574 | B2 | * | 12/2005 | Mihcak et al. .............. 713/180 |
| 6,990,444 | B2 | | 1/2006 | Hind et al. .................. 704/235 |
| 6,990,453 | B2 | | 1/2006 | Wang et al. ................. 704/270 |
| 6,996,273 | B2 | * | 2/2006 | Mihcak et al. .............. 382/181 |
| 7,095,873 | B2 | | 8/2006 | Venkatesan et al. ......... 382/100 |
| 7,152,163 | B2 | | 12/2006 | Mihcak et al. .............. 713/180 |
| 7,188,065 | B2 | | 3/2007 | Mihcak et al. .............. 704/270 |
| 2002/0126872 | A1 | | 9/2002 | Brunk et al. ................ 382/100 |
| 2002/0196976 | A1 | | 12/2002 | Mihcak et al. .............. 382/173 |
| 2003/0056101 | A1 | | 3/2003 | Epstein ....................... 713/176 |
| 2003/0118208 | A1 | | 6/2003 | Epstein ....................... 382/100 |
| 2003/0169269 | A1 | | 9/2003 | Sasaki et al. ................ 345/581 |
| 2005/0065974 | A1 | | 3/2005 | Mihcak et al. ........... 707/103 Y |
| 2005/0071377 | A1 | | 3/2005 | Mihcak et al. ........... 707/104.1 |
| 2005/0076229 | A1 | | 4/2005 | Mihcak et al. .............. 713/819 |
| 2005/0084103 | A1 | | 4/2005 | Mihcak et al. .............. 380/202 |
| 2005/0165690 | A1 | | 7/2005 | Liu et al. ....................... 705/57 |
| 2005/0180500 | A1 | | 8/2005 | Chiang et al. ............... 375/240 |

FOREIGN PATENT DOCUMENTS

| | | |
|---|---|---|
| EP | 1 253 784 | 10/2002 |
| JP | 2000050057 | 2/2000 |
| JP | 2000149004 | 5/2000 |
| JP | 2000261655 | 9/2000 |
| JP | 2000332988 | 11/2000 |
| JP | 2000350007 | 12/2000 |
| WO | WO 99/17537 | 4/1999 |
| WO | WO 99/18723 | 4/1999 |
| WO | WO 99/60514 | 11/1999 |
| WO | WO 01/11890 | 2/2001 |
| WO | WO 01/28230 | 4/2001 |
| WO | WO 02/37331 | 5/2002 |

OTHER PUBLICATIONS

Lin et al., "A Robust Image Authentication Method Distinguishing JPEG Compression from Malicious Manipulation", IEEE Transactions, Feb. 2001, vol. 11, No. 2, pp. 153-168.

Schneider et al., "A Robust Content Based Digital Signature for Image Authentication", Proceedings, International Conference, Sep. 1996, vol. 3, pp. 227-230.

Mihcak et al., "Watermarking via Optimization Algorithms for Quantizing Randomized Statistics of Image Regions" Proceedings of the Annual Allerton Conference on Communication Control and Computing Urbana IL 2002 10 pages.

Moulin et al., "The Parallel-Gaussian Watermarking Game" IEEE Transactions Information Theory Feb. 2004 pp. 1-36.

Chen et al.,"Quantization Index Modulation Methods for Digital Watermarking and Information Embedding of Multimedia" Journal of VLSI Signal Processing 27, 2001 pp. 7-33.

Mihcak et al.,"New Iterative Geometric Methods for Robust Perceptual Image Hashing" Proceedings of the Security and Privacy Digital Rights Management Workshop 2001 9 pages.

Kesal et al.,"Iteratively Decodable Codes for Watermarking Applications" Proceedings of the Second Symposium on Turbo Codes and Their Applications France Sep. 2000 4 pages.

Venkatesan et al.,"Image Watermarking with Better Resilience" Proceedings of IEEE-ICIP Vancouver BC Canada 2000 4 pages.

Mihcak et al., "Cryptanalysis of Discrete-Sequence Spread Spectrum Watermarks" Proceedings of the Information Hiding Workshop Holland 2002 21 pages.

Mihcak et al., "Blind Image Watermarking Via Derivation and Quantization of Robust Semi-Global Statistics" Proceedings of IEEE-ICASSP Orlando FL 2002 4 pages.

Chen et al,"Achievable Performance of Digital Watermarking Systems" IEEE 1999 pp. 13-18.

Mihcak et al.,"A Perceptual Audio Hashing Algorithm: A Tool For Robust Audio Identification and Information Hiding" Proceedings of the Information Hiding Workshop 2001 15 pages.

Moulin et al., "A Framework for Evaluating the Data-Hiding Capacity of Image Sources" IEEE Transactions on Image Processing vol. 11 No. 9 Sep. 2002 pp. 1-14.

Wu et al., Video Access Control Via Multi-level Data Hiding Proc. IEEE Int. Conf. on Multimedia and Expo vol. I Jul./Aug. 2000 pp. 381-384.

Fridrich et al.,"Robust Hash Functions for Digital Watermarking" Proc. Int. Conf. on Information Technology: Coding and Computing Mar. 2000 pp. 178-183.

Lee et al., "Adaptive Video Watermarking Using Motion Information" Proc SPIE vol. 3971: Security and Watermarking of Multimedia Contents II Jan. 2000 pp. 209-216.

Echizen et al.,"General Quality Maintenance Module for Motion Picture Watermarking" IEEE Trans. on Consumer Electronics vol. 45 No. 4. Nov. 1999 pp. 1150-1158.

Chang, et al., "A Spatial Match Representation Scheme for Indexing and Querying in Iconic Image Databases", ACM, available at <<http://portal.acm.org/citation.cfm?id=266890&coll=ACM&dl=ACM&CFID=68519948&CFTOKEN=85922645>>, 1997, pp. 169-176.

El-Kwae, et al., "Efficient Content-Based Indexing of Large Image Databases", ACM, available at <<http://portal.acm.org/citation.cfm?id=348762&coll=ACM&dl=ACM&CFID=68519948&CFTOKEN=85922645>>, Apr. 2000, pp. 171-210.

Lambrou, et al., "Classification of Audio Signals Using Statistical Features on Time and Wavelet Transform Domains", Acoustics, Speech and Signal Processing, 1998. Proceedings of the 1998 IEEE International Conference on Seattle, Wa, May 12-15, 1998. New York, NY, USA, IEEE, US, vol. 6, pp. 3621-3624.

Moreno, et al., "Using the Fisher Kernal Method for Web Audio Classification", Acoustics, Speech and Signal Processing, 2000. ICASSP '00. Proceedings, 2000 IEEE International Conference on Jun. 5-9, 2000, Piscataway, NJ, USA, IEEE, vol. 6, pp. 2417-1420.

Pye, D., "Content-Based Methods for the Management of Digital Music", Acoustics, Speech and Signal Processing, 2000. ICASSP '00. Proceedings, 2000 IEEE International Conference on Jun. 5-9, 2000, Piscataway, NJ, USA, IEEE, vol. 6, pp. 2437-2440.

Cox, et al, "A secure robust watermark for multimedia," Information Hiding Workshop, University of Cambridge, pp. 185-206, 1996.

Dittman, et al, "Robust MPEG video watermarking technologies," Proceedings of ACM Multimedia '98, The 6th ACM International Multimedia Conference, Bristol, England, pp. 71-80.

Petitcolas, et al, "Evaluation of copyright marking systems," Proceedings of IEEE Multimedia Systems '99, vol. 1, pp. 574-579, Jun. 7-11, 1999, Florence, Italy.

Mihçak, et al, "A tool for robust audio information hiding: A perceptual audio hashing algorithm," submitted to Workshop on Information Hiding, Pittsburgh, PA, 2001.

Kalker, et al, "Efficient detection of a spatial spread-spectrum watermark in MPEG video streams," Proc. IEEE ICIP, Vancouver, Canada, Sep. 2000.

Swanson, et al, "Object based transparent video watermarking," Proceedings of IEEE Signal Processing Society 1997 Workshop on Multimedia Signal Processing, Jun. 23-25, 1997, Princeton, New Jersey, USA.

Chen, et al, "Digital watermarking and information embedding using dither modulation," Proc. IEEE Workshop on Multimedia Signal Processing, Redondo Beach, CA, pp. 273-278, Dec. 1998.

Politis, et al., "An Audio Signatures Indexing Scheme for Dynamic Content Multimedia Databases", Electrotechnical Conference, 2000. IEEE, vol. 2, May 29, 2000, pp. 725-728.

Cheng et al. "Aircraft identification based on the algebraic method" Hybrid Image and Signal Processing III, vol. 1702, Apr. 23, 1992, pp. 298-305.

Kozat S. S. et al., "Robust Preceptual Image Hashing Via Matrix Invariants" Image Processing, 2004. Oct. 24, 2004.

Cheng et al, "Aircraft identification based on the algebraic method" Hybrid Image and Signal Processing III, vol. 1702, Apr. 23, 1992, pp. 298-305.

Venkatesan, et al., "Image Hashing", Microsoft Research, Mar. 24, 2000, pp. 1-8.

Malvar, "A Modulated Complex Lapped Transform and Its Applications to Audio Processing," IEEE ICASSP'99, Phoenix, Arizona, Mar. 1999, pp. 1-4.

Venkatesan, S.-M. Koon, M.H. Jakubowski and P. Moulin, "Robust Image Hashing," Cryptography Group, Microsoft Research, 3 pages, unknown date.

B. Chen and G. W. Wornell, "Dither modulation: a new approach to digital watermarking and information embedding," Proc. of SPIE: Security and Watermarking of Multimedia Contents, vol. 3657, pp. 342-353, 1999.

B. Chen and G. W. Wornell, "Quantization Index Modulation: A class of Provably Good Methods for Digital Watermarking and Information Embedding," IEEE Trans. Inform. Theory, 1999 and 2000, pp. 1-54.

"The Singular Value Decomposition", at <<http://www2.imm.dtu.dk/pch/Projekter/tsvd.html>>, Aug. 20, 1999, pp. 3.

* cited by examiner

SYSTEM AND METHOD FOR HASHING DIGITAL IMAGES

RELATED APPLICATIONS

This is a continuation of pending U.S. patent application Ser. No. 09/421,986, entitled "System and Method for Hashing Digital Images," filed on Oct. 19, 1999 U.S. Pat. No. 6,671,407.

TECHNICAL FIELD

This invention relates to systems and methods for hashing digital bit streams such as digital images. This invention further relates to database systems and methods that utilize the hashing techniques for indexing bit streams and protecting copyrights in the bit streams.

BACKGROUND

Digital images offer many advantages over conventional media in terms of image quality and ease of transmission. However, digital images consume large amounts of memory space. With the ever increasing popularity of the Internet, digital images have become a mainstay ingredient of the Web experience, buoyed by such advances as the increasing speed at which data is carried over the Internet and improvements in browser technology for rendering such images. Everyday, numerous digital images are added to Web sites around the world.

As image databases grow, the needs for indexing them and protecting copyrights in the images are becoming increasingly important. The next generation of database management software will need to accommodate solutions for fast and efficient indexing of digital images and protection of copyrights in those digital images.

A hash function is one probable solution to the image indexing and copyright protection problem. Hash functions are used in many areas such as database management, querying, cryptography, and many other fields involving large amounts of raw data. A hash function maps large unstructured raw data into relatively short, structured identifiers (the identifiers are also referred to as "hash values" or simply "hash"). By introducing structure and order into raw data, the hash function drastically reduces the size of the raw data into short identifiers. It simplifies many data management issues and reduces the computational resources needed for accessing large databases.

Thus, one property of a good hash function is the ability to produce small-size hash values. Searching and sorting can be done much more efficiently on smaller identifiers as compared to the large raw data. For example, smaller identifiers can be more easily sorted and searched using standard methods. Thus, hashing generally yields greater benefits when smaller hash values are used.

Unfortunately, there is a point at which hash values become too small and begin to lose the desirable quality of uniquely representing a large mass of data items. That is, as the size of hash values decreases, it is increasingly likely that more than one distinct raw data can be mapped into the same hash value, an occurrence referred to as "collision". Mathematically, for A alphabets of each hash digit and a hash value length l, an upper bound of all possible hash values is $A^l$. If the number of distinct raw data are larger than this upper bound, collision will occur.

Accordingly, another property of a good hash function is to minimize the probability of collision. However, if considerable gain in the length of the hash values can be achieved, it is sometimes justified to tolerate collision. The length of the hash value is thus a trade off with probability of collision. A good hash function should minimize both the probability of collision and the length of the hash values. This is a concern for design of both hash functions in compilers and message authentication codes (MACs) in cryptographic applications.

Good hash functions have long existed for many kinds of digital data. These functions have good characteristics and are well understood. The idea of a hash function for image database management is very useful and potentially can be used in identifying images for data retrieval and copyrights protection. Unfortunately, while there are many good existing functions, digital images present a unique set of challenges not experienced in other digital data, primarily due to the unique fact that images are subject to evaluation by human observers. A slight cropping or shifting of an image does not make much difference to the human eye, but such changes appear very differently in the digital domain. Thus, when using conventional hashing functions, a shifted version of an image generates a very different hash value as compared to that of the original image, even though the images are essentially identical in appearance. Another example is the deletion of one line from an image. Most people will not recognize this deletion in the image itself, yet the digital data is altered significantly if viewed in the data domain.

Human eyes are rather tolerant of certain changes in images. For instance, human eyes are much less sensitive to high frequency components of an image than low frequency components. In addition, the average (i.e., DC component) is interpreted by our eyes as brightness of an image and it can be changed within a range and cause only minimal visible difference to the observer. Our eyes would also be unable to catch small geometric deformation in most images.

Many of these characteristics of the human visual system can be used advantageously in the delivery and presentation of digital images. For instance, such characteristics enable compression schemes, like JPEG, to compress images with good results, even though some of the image data may be lost or go unused. There are many image restoration/enhancement algorithms available today that are specially tuned to the human visual system. Commercial photo editing systems often include such algorithms.

At the same time, these characteristics of the human visual system can be exploited for illegal or unscrupulous purposes. For example, a pirate may use advanced image processing techniques to remove copyright notices or embedded watermarks from an image without visually altering the image. Such malicious changes to the image are referred to as "attacks", and result in changes at the data domain. Unfortunately, the user is unable to perceive these changes, allowing the pirate to successfully distribute unauthorized copies in an unlawful manner. Traditional hash functions are of little help because the original image and pirated copy hash to very different hash values, even though the images appear the same.

Accordingly, there is a need for a hash function for digital images that allows slight changes to the image which are tolerable or undetectable to the human eye, yet do not result in a different hash value. For an image hash function to be useful, it should accommodate the characteristics of the human visual system and withstand various image manipulation processes common to today's digital image processing. A good image hash function should generate the same unique identifier even though some forms of attacks have been done to the original image, given that the altered image is reasonably similar to a human observer when comparing with the original image. However, if the modified image is visually different or the attacks cause irritation to the observers, the hash function should recognize such degree of changes and produce a different hash value from the original image.

SUMMARY

This invention concerns a system and method for hashing digital images in a way that allows modest changes to an image, which may or may not be detectable to the human eye, yet does not result in different hash values for the original and modified images.

According to one implementation, a system stores original images in a database. An image hashing unit hashes individual images to produce hash values that uniquely represent the images. The image hashing unit implements a hashing function H, which takes an image I and an optional secret random string as input, and outputs a hash value X according to the following properties:

1. For any image $I_i$, the hash of the image, $H(I_i)$, is approximately random among binary strings of equal length.
2. For two distinct images, $I_1$ and $I_2$, the hash value of the first image, $H(I_1)$, is approximately independent of the hash value of the second image, $H(I_2)$, in that given $H(I_1)$, one cannot predict $H(I_2)$ without knowing a secret key used to produce $H(I_1)$.
3. If two images $I_1$ and $I_2$ are visually the same or similar, the hash value of the first image, $H(I_1)$, should equal the hash value of the second image, $H(I_2)$.

The hash value is stored in an image hash table and is associated via the table with the original image I from which the hash is computed. This image hash table can be used to index the image storage.

The processing system also has a watermark encoder to watermark individual images. The watermark encoder computes a watermark based on the hash value X and a secret W. Using both values effectively produces unique secrets for each individual image. Thus, even if the global watermark secret is discovered, the attacker still needs the hash value of each image to successfully attack the image. As a result, the system is resistant to BORE (Break Once, Run Everywhere) attacks, thereby providing additional safeguards to the images.

The watermark encoder encodes the watermark into the original image I to produce a watermarked image I'. The system may store and/or distribute the watermarked image.

According to an aspect of this invention, the system can be configured to search over the Internet to detect pirated copies. The system randomly collects images from remote Web sites and hashes the images using the same hashing function H. The system then compares the image hashes to hashes of the original images. If the hashes match, the collected image is suspected as being a copy of the original.

BRIEF DESCRIPTION OF THE DRAWINGS

The same numbers are used throughout the drawings to reference like elements and features.

DETAILED DESCRIPTION

This invention is described below as a technique for hashing digital images. Thus, the described hashing techniques are particularly tailored to accommodate characteristics of the human visual system and withstand various image manipulation processes common to today's digital image processing. However, the invention is not limited in its application to digital images. Rather, the described techniques can also be applied to other sampled or digitized media streams such as digitized audio streams.

The described hashing techniques generate the same unique identifier even though some forms of attacks have been done to the original image, given that the altered image is reasonably similar to a human observer when comparing the altered image with the original image. However, if the altered image is visually different or the attacks cause irritation to the observers, the hash function recognizes such degree of changes and produces a different hash value from the original image.

The hash function implemented by various systems and methods described herein is denoted as H. Given an input image I, the hash function H produces a short binary string X, as follows:

$$H(I)=X$$

The hash function H has the following properties:

4. For any image $I_i$, the hash of the image, $H(I_i)$, is approximately random among binary strings of equal length.
5. For two distinct images, $I_1$ and $I_2$, the hash value of the first image, $H(I_1)$, is approximately independent of the hash value of the second image, $H(I_2)$, in that given $H(I_1)$, one cannot predict $H(I_2)$ without knowing a secret key used to produce $H(I_1)$.
6. If two images $I_1$ and $I_2$ are visually the same or similar, the hash value of the first image, $H(I_1)$, should equal the hash value of the second image, $H(I_2)$.

A special case of the third property is where an original image is attacked to remove the watermark or copyright notice. In this case, suppose the original image $I_O$ is modified to include a watermark, thus producing a watermarked image $I_{WM}$. Using property three, the images are visually identical and hence, $H(I_O)=H(I_{WM})$. Now, suppose that the watermarked image is attacked using digital image processing techniques to remove the watermark and produce a pirate image $I_P$, which is visually identical to the original image $I_O$ and the watermarked image $I_{WM}$. In this case, the hash values are also the same, i.e., $H(I_{WM})=H(I_P)$.

One exemplary implementation of the hashing function H is described below in more detail. In addition, exemplary implementations of the hashing technique in various systems and methods are described below, beginning with an architecture for electronic distribution of digital images over a network, such as the Internet.

System Architecture

Figure 1:
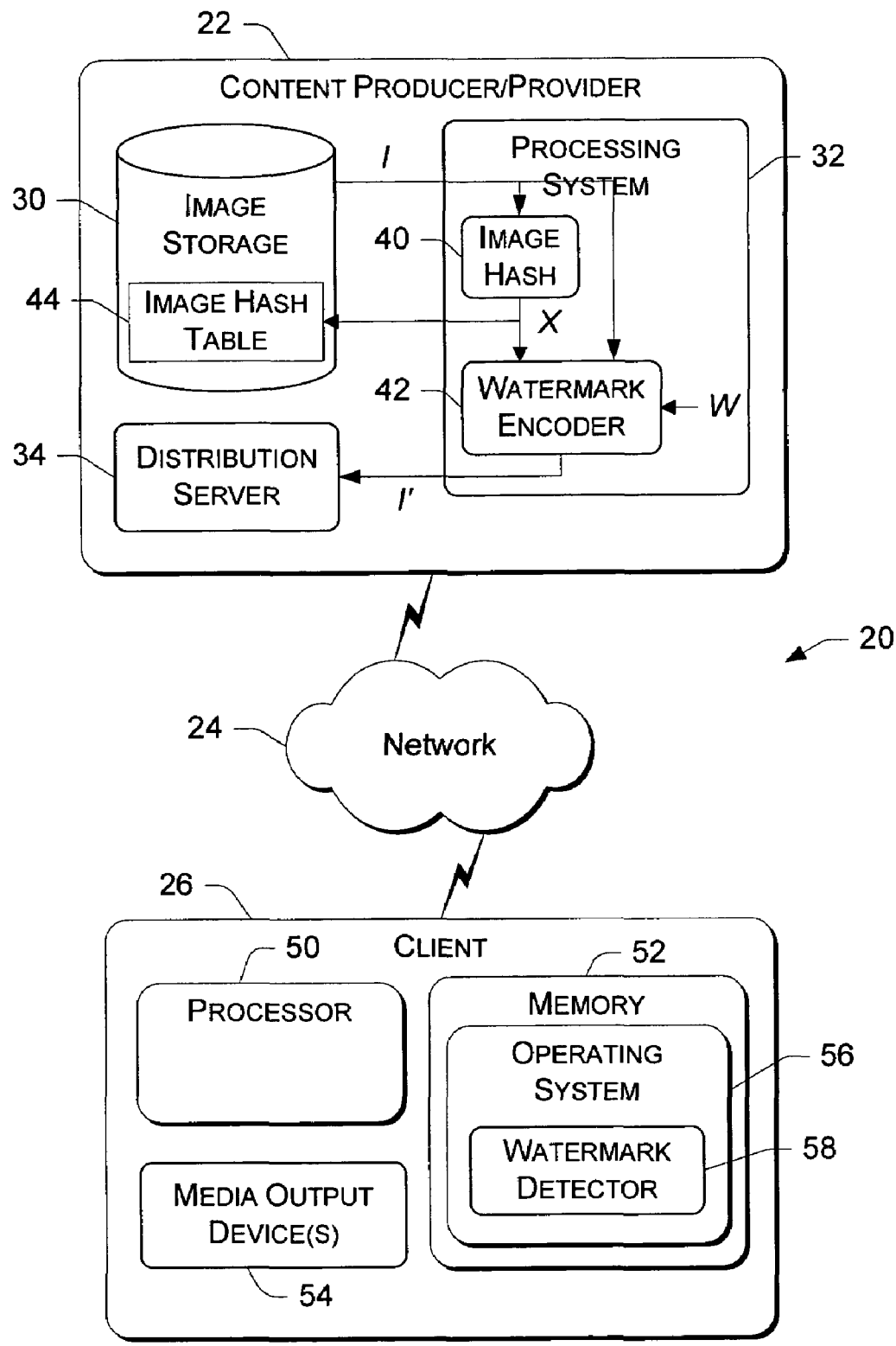
FIG. 1 is a block diagram of an image distribution system in which a content producer/provider hashes and watermarks digital images and subsequently distributes them to a client over a network.

FIG. 1 shows an image distribution system 20 having a content producer/provider 22 that produces digital images and/or distributes the digital images over a network 24 to a client 26. The content producer/provider 22 has an image storage 30 to store digital images, a processing system 32 to process the images prior to distribution, and a distribution server 34 to distribute the images over the network 24 (e.g., Internet, LAN, WAN, etc.). The server 34 may be further configured to compress and/or encrypt the images using conventional compression and encryption techniques prior to distributing the content over the network 24.

The processing system 32 has an image hashing unit 40 that hashes individual images to produce hash values that uniquely represent the images. The image hashing unit 40 implements the hashing function H, which takes an image I as input, and outputs a hash value X according to the properties described above. The hash value is stored in an image hash table 44 in storage 30 and is associated via the table 44 with the original image I from which the hash is computed. This image hash table 44 can be used to index the image storage 30.

The processing system 32 also has a watermark encoder 42 to watermark individual images. A watermark is an array of bits generated using known cryptographic techniques and embedded into a digital image, without affecting the appearance of the image. The watermark encoder 42 receives the hash value X, and computes a watermark based, in part, on the hash value X and a secret W. The watermark encoder 42 encodes the watermark into the original image I to produce a watermarked image I'. The system 32 may store the watermarked image I' in the image storage 30 and/or passed to the distribution server 34 for distribution over the network 24 to the client 26.

An advantage of computing the watermark based on the hash value X is that it adds security on a per image basis. Normally, a single watermark based on the watermark secret W is globally applied to all images in the storage 30. In contrast, image hash unit creates separate and distinct hash values X for each of the images. The watermark encoder 42 then uses these values in conjunction with the watermark secret W to effectively produce unique secrets for each individual image. Thus, even if the watermark secret is discovered, the attacker still needs the hash value of each image to successfully attack the image. As a result, the system is resistant to BORE (Break Once, Run Everywhere) attacks, thereby providing additional safeguards to the images.

It is noted that the image hashing unit 40 and watermark encoder 42 may be implemented in software or firmware. These components may be constructed as part of a processing system, incorporated into other applications or an operating system, or formed as separate standalone modules. The content producer/provider 22 may be implemented in many ways, including as one or more server computers configured to store, process, and distribute digital images.

The client 26 is equipped with a processor 50, a memory 52, and one or more media output devices 54. The processor 50 runs various tools to process the digital images, such as tools to decompress the images, decrypt the date, and/or apply controls (size, rotation, etc.). The memory 52 stores an operating system 56, such as a Windows brand operating system from Microsoft Corporation, which executes on the processor. The client 26 may be embodied in a many different ways, including a computer, a handheld entertainment device, a set-top box, a television, and so forth.

The operating system 56, or any trusted software or hardware on the client machine, may implement a client-side watermark detector 58 to detect the watermark in the digital images. If the watermarks are present, the client is assured that the content is original and can be played. Absence of the watermark indicates that the image is a pirated copy of the original. The operating system 56 and/or processor 50 may be configured to enforce certain rules imposed by the content producer/provider (or copyright owner). For instance, the operating system and/or processor may be configured to reject fake or copied images that do not possess a watermark.

Image Hash Unit

Figure 2:
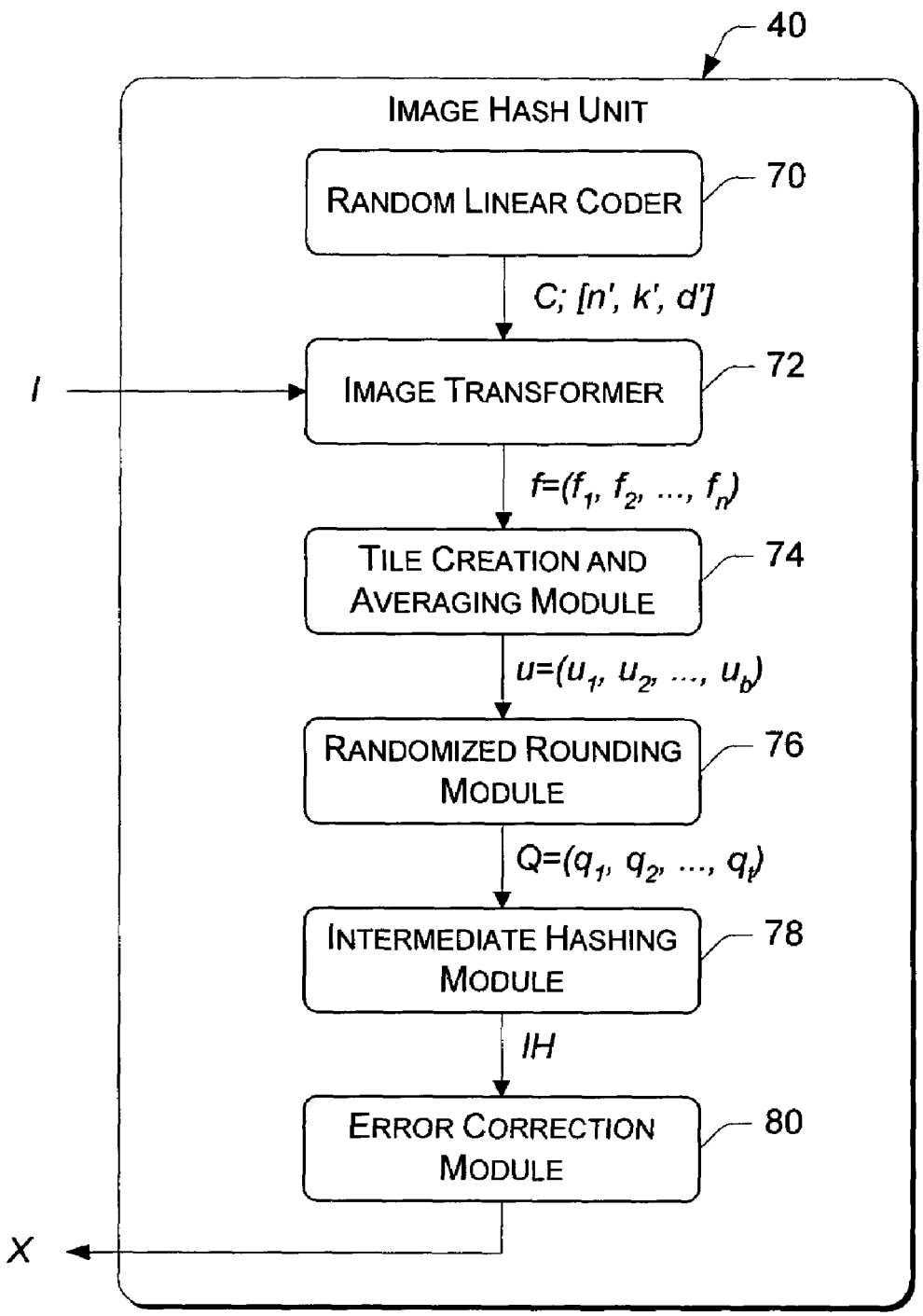
FIG. 2 is a functional block diagram of an image hash unit implemented at the content producer/provider of FIG. 1 to hash the digital images.

FIG. 2 shows the image hash unit 40 in more detail. The image hash unit 40 includes a random linear coder 70, an image transformer 72, a tile creation and averaging module 74, a randomized rounding module 76, an intermediate hashing module 78, and an error correction module 80. These components are preferably implemented in software, although some or all of the components may be implemented in firmware or hardware.

The random linear coder 70 selects a random linear code C that is used later in the processing by the error correction module. The selection is performed once during initialization and the linear code C is used for all images. The linear code C has three selectable parameters n', k', and d', where n' represents a length of a random string, k' represents a length of the original message, and k' represents a Hamming distance. The linear code C has the following properties:

$$C=\{B:AB=0 \bmod 2\}$$

where A is an m'×n' matrix (m' is computed from n', k', and d') in which each entry is chosen randomly from a set of values {0, 1}. B is an n'×1 matrix containing an n'-bit array generated by the pseudo-random number generator. As an example, the set of parameters (n', k', d') equal (32, 15, 5).

The image transformer 72 receives an original image I and computes a transformation of the image using a transform function $f$, where $f=(f_1, f_2, \ldots, f_n)$. The transformer 72 may use one of many conventional transforms, such as a Fourier transform, a wavelet transform, and a DCT (Discrete Cosine transform) transform. As one exemplary implementation, the image transformer 72 uses a wavelet transform to decompose the image into three levels or subbands: a coarse subband, a high-low subband, and a low-high subband.

The tile creation and averaging module 74 randomly divides the image transform image into multiple tiles t, where each tile contains data for multiple pixels in the image. Two possible techniques for constructing the tiles are (1) forming non-overlapping rectangular tiles and (2) creating overlapping rectangular tiles.

Figure 3:
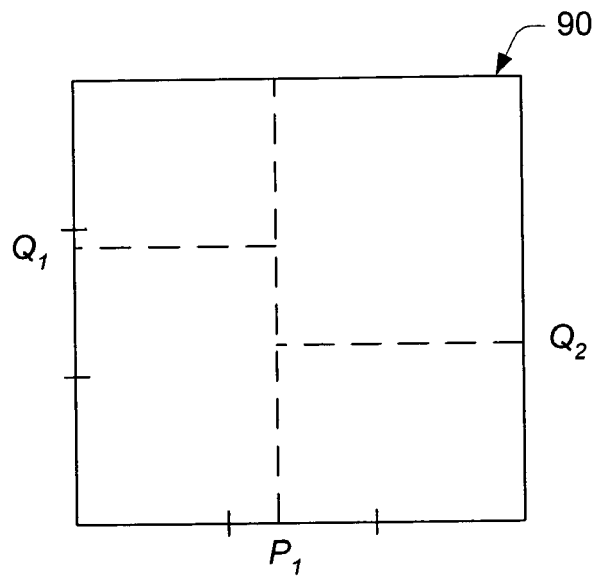
FIG. 3 is a diagrammatic illustration of a process of dividing an image transform into multiple non-overlapping tiles.

FIG. 3 illustrates the process of forming non-overlapping tiles. Given image transform 90, the tile creation module 74 randomly picks a point $P_1$ somewhere between one-third and two-thirds of the base and divides the image transform 90 into side-by-side rectangles. The module 74 then randomly selects a point $Q_1$ somewhere between one-third to two-thirds of the height and divides the left-side rectangle. One can use any suitable distribution that splits the image into approximately equal portions here. Similarly, the module 74 randomly selects a point $Q_2$ somewhere between one-third to two-thirds of the height and divides the right-side rectangle. This process is repeated for each of the subrectangles until a predetermined number of tiles is created.

Figure 4:
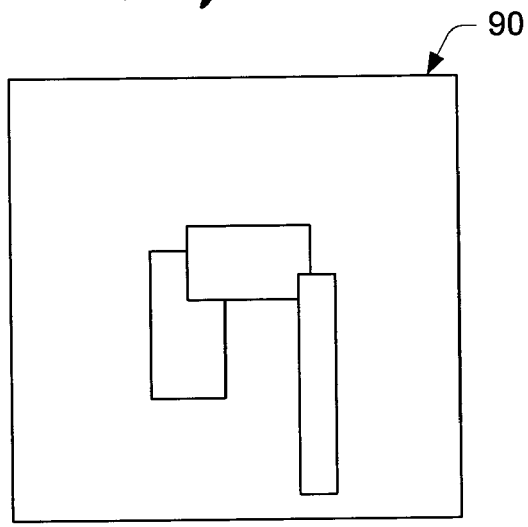
FIG. 4 is a diagrammatic illustration of a process of dividing an image transform into multiple overlapping tiles.

FIG. 4 illustrates the process of forming overlapping tiles. Given the image transform 90, the tile creation module 74 randomly draws a series of rectangles over the space, until the predetermined number of tiles is created.

In the continuing exemplary implementation in which a wavelet transform is used, each subband—coarse, low-high, and high-low—is divided into 64 small rectangles with random sizes. The coarse subband is divided using the non-overlapping process of FIG. 3, whereas the high and high-high subbands are divided using the overlapping process of FIG. 4. This produces 192 tiles for an image.

After tile creation, the tile creation and averaging module 74 computes an average of each tile t. In the continuing example involving a wavelet transform, suppose that a tile of the transformed image has data for pixels $g_1, g_2, \ldots, g_N$. The tile creation and averaging module 74 produces an average µ for each tile t, as follows:

$$u_i = \frac{\sum_{j=1}^{N} g_j}{N}$$

In high and high-high subbands, the average may be zero. In those cases, the variance is computed instead of the average, as follows:

$$V^2 = \frac{\sum_{j=1}^{N} g_j^2}{N}$$

For the coarse subband, the module 74 quantizes the averages of the tiles into eight (an example value) distinct levels based on an absolute value of the tile average. The maximum value for the coarse subband is 2040 (i.e., 255*8) and this value is divided by eight to produce eight different quantization levels. A total of 126 values are computed for the 64 random tiles and their combinations.

As for the high-low and low-high subbands, where the average values are guaranteed to be zero, the variances are computed and fitted by an exponential distribution so that the values fall into approximately eight different levels. To reduce the effect from exclusion/inclusion of an edge in the tile due to shifting of an image, a window function is used around the tile to reduce the effect of edges.

The tile creation and averaging module 74 outputs an average vector $\mu=(\mu_1, \mu_2, \ldots, \mu_t)$ having averages for the t tiles in the image.

With continuing reference to FIG. 2, the randomized rounding module 76 receives the average vector and computes, for each subband, the average of all the tiles' variances. Using this average, the rounding module 76 creates an exponential distribution and generates eight distinct quantization levels based on this distribution. Each quantization level has a probability mass of one-eighth, meaning that for a random tile the results from rounding will be uniformly distributed across the quantization levels. The quantization levels are represented as $A_0$ to $A_7$. The rounding module 76 rounds each of the averages $\mu_i$ for each tile t to one of the eight quantization levels.

Figure 5:
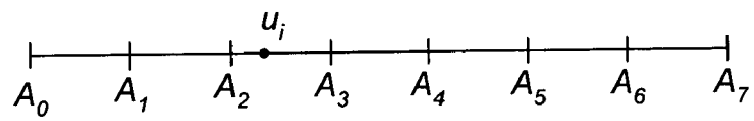
FIG. 5 is a diagrammatic illustration of quantization points to demonstrate a process of rounding tile averages to one of the points.

FIG. 5 illustrates the rounding process. Suppose that an average $\mu_i$ falls between quantization levels $A_2$ and $A_3$. The rounding module 76 tends to favor rounding the average $\mu_i$ toward the closer of the two quantization levels, which in this case is level $A_2$. But, the rounding module 76 also introduces some randomness to make it more difficult for an attacker to predict the outcome of the rounding. The randomness essentially imposes a coin flip strategy in which the mathematical expectation of the outcome after the rounding is equal to the original value of the quantity being rounded. Stated alternatively, the mathematical expectation of the outcome should be equal to a continuous function of the value being rounded. Also one may use a buffered rounding strategy where the given quantity ($\mu_i$) is rounded to the nearest number A2 or A, if the distance to the nearest number is smaller than some pre-determined bound. As a result, the rounding module 76 effectively rounds the average $\mu_i$ toward one of the two quantization levels according to a coin flip that is biased slightly toward rounding to the nearest of the two quantization levels. It is further noted that the quantization levels are generated in the first place with a goal of making the expected value of the rounding to be equal to the original value, and any small changes in the given quantity will result in small changes in the expected value of the final rounded output.

Mathematically, let ρ represent a distance parameter involving $\mu_i$ and the two nearest quantization levels $A_2$ and $A_3$. By this we mean $$\rho=(\mu_i-A_2)/(A_3-A_2); \text{ or}$$

Now we flip a coin which has bias ρ of getting heads and 1−ρ for tails. Then if we get a head we round $\mu_i$ to A3. Otherwise, we round it to A2. The distance parameter ρ generates a bias towards the closer value while the random number r provides some randomness to make it more difficult for the attacker to predict the outcome.

The rounded values are mapped into k-bit binary strings $q_1, q_2, \ldots, q_t$, one string for each tile t. In our continuing example, the rounded values are mapped into 3-bit binary strings representative of the quantization points $A_0 \ldots -A_7$. A value $\mu_i$ that rounds to $A_0$ is mapped to binary string "000", a value $\mu_i$ that rounds to $A_1$ is mapped to "001", a value $\mu_i$ that rounds to $A_2$ is mapped to "010", and so on. As noted above, the points $A_0-A_7$ are chosen so that for a random tile, the rounding steps yields uniformly distributed 3-bit binary strings. The k-bit binary strings are appended together to form a composite value Q, which is output by the randomized rounding module 76.

The rounding sub-process provides particular advantages for the image hashing process. The rounded values are used instead of the precise averages in later computation of the hash values. In this manner, slight modifications can be made to an image without changing the hash value for the image. That is, an attacker can make minor changes, such as removing a watermark, that modify the averages $\mu_i$ for some or all of the tiles. Without rounding and the subsequent error-correction sections, these changes would result in a different hash value. However, with the rounding process and the error correction, these changes do not carry through to the resulting rounded values and hence, the hash value for the two images remains the same.

The intermediate hash module 78 receives the composite value Q and produces an intermediate hash IH with the following properties:

1. For two visually distinct images $I_1$ and $I_2$, the intermediate hash values differ approximately 60% of the time.
2. For two visually similar images I1 and I2, the intermediate hash values agree in all but approximately 20% of the time.

The above numbers (60% 20%) are indicative of the exemplary implementation and can vary depending on the characteristics of the digitized stream.

In the continuing example, the intermediate hashing module 78 implements a first order Reed-Muller error correction code decoder. Such decoders are well known and other error correcting code decoders may be used (See, e.g., NJA Sloane and Mc Williams, "Theory of Error Correcting Codes", North Holland). The Reed-Muller decoder (or other suitable decoder) is modified, however, to work with a distance function we call an exponential pseudo-norm. Given a vector $v=(v_1, v_2, \ldots, v_l)$, the pseudo-random norm is:

$$\text{norm}(v) = \sum_{i=1}^{l} C^{|v_i|}$$

It is noted that the image hash unit 40 does not employ a complementary encoder, but only the decoder.

The error correction module 80 receives the intermediate hash IH and reduces the hash size and number of error occurrences. In our continuing example, the error correction module 80 extracts a subset of bits from the intermediate hash IH. The subset of bits is chosen so that approximately one-half of the bits are extracted from the coarse subbands and one-fourth of the bits are extracted from each of the two high frequency subbands. There are hundreds of bits in the intermediate hash IH and the extracted subset of bits typically numbers less than one hundred.

From the subset, the error correction module 80 further extracts a reduced set of bits, such as 32 bits. This reduced set of bits is then processed using a list-decoding process into a small list $\{X_1, X_2, \ldots, X_r\}$, where r is small. List-decoding is well known. For a very brief discussion on list-decoding, the reader is directed to the last section of L. A. Levine, "One-Way Functions and Pseudo-Random Generators", Combinatorica 7, 1987, pgs. 357-363, and to P. Elias, "Personal Communication to L. A. Levin", 1988. Also see the following references:

Sudan, Madhu; *Proceedings of the 37th Annual IEEE Symposium on Foundations of Computer Science;* "Maximum Likelihood Decoding of Reed Solomon Codes"; 1996 (a more recent version of this paper, entitled "Decoding Reed Solomon Codes Beyond the Error-Correction Bound", is available by request from MIT Laboratory of Computer Sciences, and is available on the Internet at the time of this writing at "http://theory.lcs.mit.edu/~madhu/papers/reedsolomon.ps".

*Journal of Complexity*, Special issue dedicated to Shmuel Winograd, 13(1): 180-193, March 1997.

One word is selected from this list using image parameters/semantics to produce a final hash value X. Specifically, a word is selected using a maximum likelihood method. In the example, the resultant hash value is 32 bits. However, if this value results in a higher probability of collision, a longer hash value may be obtained by running the process twice to produce two 32-bit values or by increasing the parameters of the linear coding unit 70 to produce larger encoded messages.

Exemplary Contexts

The image hashing process described above, and implemented in the image hashing unit 40, can be used in many ways and in a number of contexts. For instance, the image hashing process can be used as an indexing system for a large database of images. In this context, the image hashes X are stored in an indexing table 44 (FIG. 1) and used to rapidly index the associated images in the image storage 30.

Another exemplary context is to use the image hashing process as a way to police search over the Internet to detect pirated copies. Generally, this is done by randomly collecting images, hashing them, and comparing the image hashes to hashes of the original images. If the hashes match, the collected image is suspected as being a copy of the original.

Figure 6:
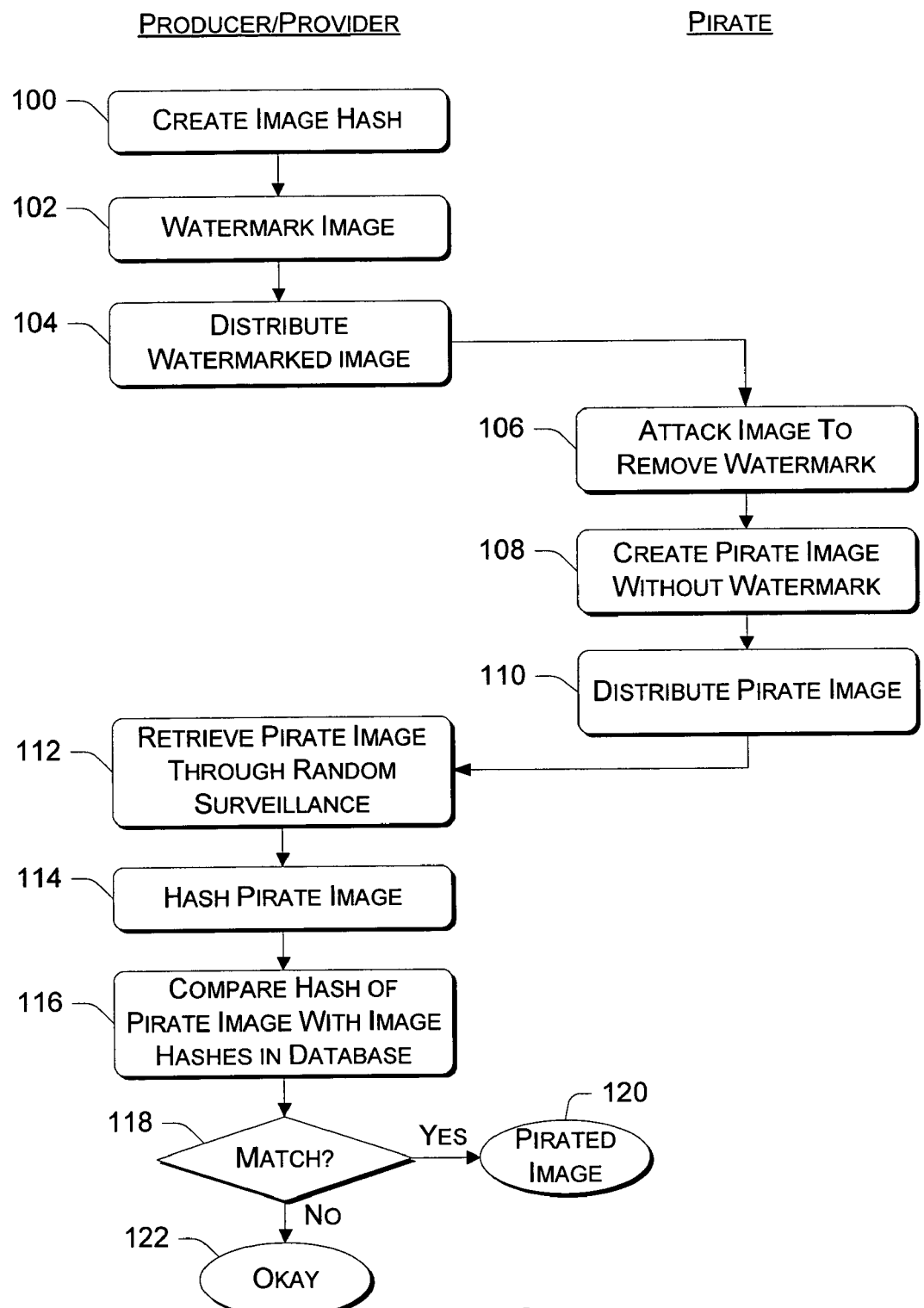
FIG. 6 is a flow diagram showing a method for distributing watermarked digital images over a network and through surveillance, detecting pirated versions of the digital images using a hash compare operation.

FIG. 6 illustrates a detailed process of distributing watermarked digital images and through surveillance, detecting pirated versions of the digital images using the image hash process. The process is implemented primarily in software, although aspects may be implemented using hardware and firmware. The process is further described with reference to FIG. 1.

At step 100, the processing system 32 of the content producer/provider 22 retrieves an image from the image store 30 and computes an image hash X associated with the image. The image hash X is stored in the image hash table 44 and associated with the original image. The processing system 32 then watermarks the image using the image hash X and a secret key W to produce the watermark (step 102). This combination of secrets makes the watermark unique to each image, rather than global to all images. The watermarked images may optionally be stored in the image storage 30.

At step 104, the distribution server 34 distributes the watermarked image I' over the network 24 to a client 26. In this case, suppose the client is a pirate who intends to attack the image and remove the watermark (step 106). Through the attacks, the pirate is able to produce a pirated version of the image that is visually identical or very similar, but without the watermark (step 108). The pirate then redistributes the pirated version for illicit gain (step 110).

Through standard surveillance practices, the original content producer/provider 22 routinely and randomly gathers images from various Web sites. In a routine sweep, the content producer/provider 22 collects the pirated version along with other images (step 112). The content producer/provider 22 uses the image hash unit 40 to compute image hashes of each collected image (step 114). The content producer/provider 22 then compares each image hash of the collected images with image hashes stored in the image hash table 44 to evaluate whether any match occurs (step 116). If the image hash of a collected image matches a stored image hash (i.e., the "yes" branch from step 118), the image is detected as potentially being a pirated version (step 120). Conversely, if no match occurs, the collected versions are not considered duplicate or altered versions of the original images (step 122).

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method for hashing an image, comprising:
    receiving an image; and
    deriving a single hash value representative of the image, as a whole, such that images that are visually distinct result in hash values that are approximately independent of one another and images that are different but visually similar result in identical hash values, whereby a comparison between a hash value representative of a first image and a hash value representative of a second image indicates whether the first and second images are visually distinct or visually similar.

2. A computer-implemented method as recited in claim 1, further comprising storing the hash value in association with the image.

3. A computer-implemented method as recited in claim 1, further comprising indexing the image using the hash value.

4. A computer-implemented method as recited in claim 1, further comprising comparing the hash value with another hash value derived from another image.

5. A computer-implemented method comprising:
receiving an image;
deriving a hash value representative of the image, as a whole, such that images that are visually distinct result in hash values that are approximately independent of one another and images that are different but visually similar result in identical hash values; and
watermarking the digital image using, in part, the hash value to produce a watermarked image, whereby the watermarked image is resistant to break once run everywhere (BORE) attacks.

6. A computer-implemented hashing method, comprising:
computing a single hash value representative of a digital image, as a whole, such that images that are visually distinct result in hash values that are approximately independent of one another and images that are different but visually similar result in identical hash values; and
storing the hash value in relationship with the digital image, whereby a plurality of digital images are indexed using hash values, each representative of one of the plurality of digital images.

7. A computer-implemented hashing method, comprising:
computing a hash value representative of a digital image, as a whole, such that images that are visually distinct result in hash values that are approximately independent of one another and images that are different but visually similar result in identical hash values; and
watermarking the digital image with a watermark derived, in part, using the hash value, whereby a comparison between the digital image with the watermark and a second image indicates whether the second image is a legitimate copy of the digital image.

8. A system for processing digital images, comprising:
an image hashing unit to compute a single hash value representative of a digital image, as a whole, such that images that are visually distinct result in hash values that are approximately independent of one another and images that are different but visually similar result in identical hash values; and
a storage to hold the hash value.

9. A system for processing digital images as recited in claim 8, further comprising:
a watermark encoder to watermark the digital image using, in part, the hash value to produce a watermarked image.

10. A system for processing digital images as recited in claim 8, further comprising:
an image comparison module to compare the hash value representative of the image with a second hash value representative of a second image to determine whether the images are visually distinct or visually similar.

11. A system for processing digital images, comprising:
an image hashing unit to compute a hash value representative of a digital image, as a whole, such that images that are visually distinct result in hash values that are approximately independent of one another and images that are different but visually similar result in identical hash values; and
a watermark encoder to watermark the digital image using, in part, the hash value to produce a watermarked image.

12. A computer-readable medium having computer-executable instructions, which when executed on a processor, direct a computer to:
compute a single hash value representative of a digital image, as a whole, such that images that are visually distinct result in hash values that are approximately independent of one another and images that are different but visually similar result in identical hash values; and
store the hash value in relationship with the digital image, whereby a comparison between a hash value representative of the digital image and a hash value representative of a second image indicates whether the digital image and the second image are visually distinct or visually similar.

13. A computer-readable medium as recited in claim 12, further comprising computer-executable instructions, which when executed on a processor, direct a computer to:
index the digital image using the hash value.

14. A computer-readable medium as recited in claim 12, further comprising computer-executable instructions, which when executed on a processor, direct a computer to:
watermark the digital image using, in part, the hash value to produce a watermarked image.

15. A computer-readable medium as recited in claim 12, further comprising computer-executable instructions, which when executed on a processor, direct a computer to:
compare the hash value with another hash value representative of another image.

* * * * *